Nov. 16, 1926. 1,607,251
J. W. EASTER
RAILWAY CAR COUPLER
Filed May 1, 1926
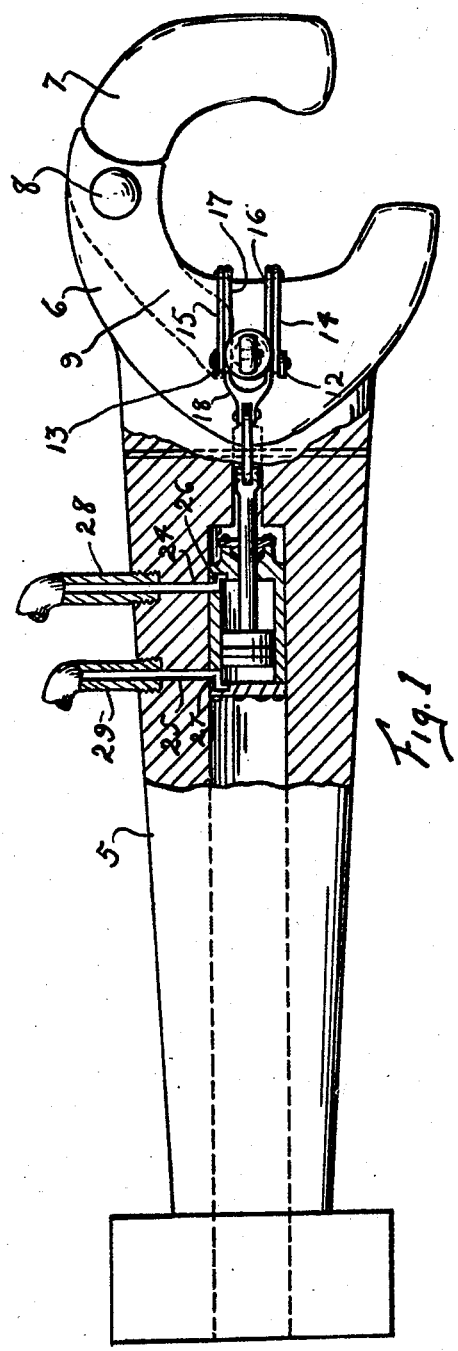
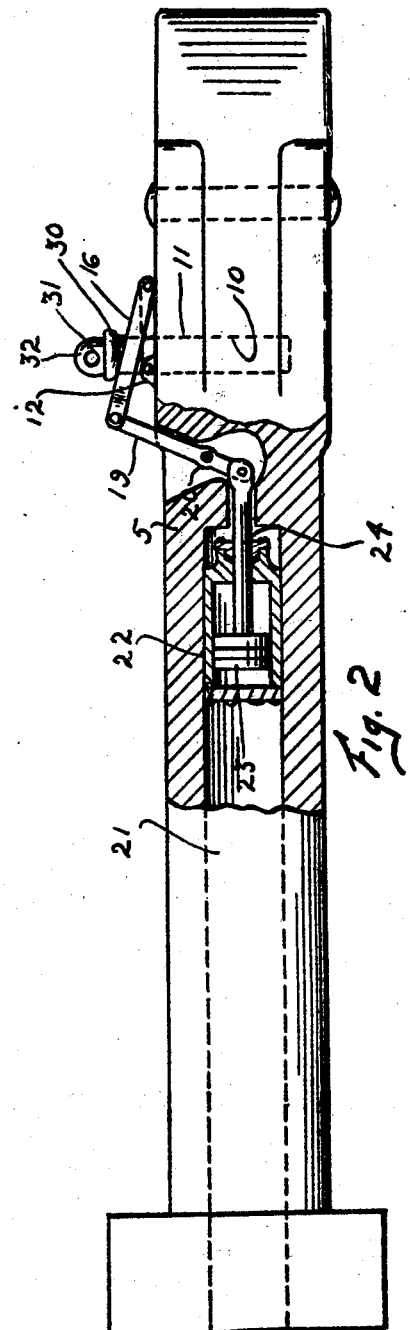
INVENTOR
JOHN W. EASTER
ATTORNEY.

Patented Nov. 16, 1926.

1,607,251

UNITED STATES PATENT OFFICE.

JOHN WILLIAM EASTER, OF FRESNO, CALIFORNIA.

RAILWAY-CAR COUPLER.

Application filed May 1, 1926. Serial No. 105,984.

My invention relates primarily to what is known as the automatic coupler or M. C. B. type and it has for its object the provision of mechanism for use with the same, whereby, the coupler can be automatically released or locked from the cab of the locomotive or from any of the suitable or desired locations.

A further object is to provide means whereby the couplers can be positioned for connecting together without the necessity of passing between the cars thereby greatly reducing, if not eliminating the danger of injury to the brakeman or persons from injury around the train.

Another object provided in the mechanism of the above character which will be simple in construction and operation and of a maximum of efficiency.

Other objects and advantages will appear hereinafter, and while I have shown and will describe the preferred form of my invention, it will be understood that I do not limit myself to such preferred form, but that various changes and adaptations may be made therein without departing from the spirit of my invention.

In the drawings accompanying and forming a part hereof:

Fig. 1 is a top plan, partly broken away, of a coupler equipped with my mechanism.

Fig. 2 is a side elevation of Fig. 1.

Referring to the drawings, 5 indicates the coupler body of the usual construction, 6 the stationary jaws secured thereto and 7, the movable jaw pivotally connected to jaw 6 by pivot 8. 9 indicates the locking tongue integral with jaw 7, the free end of which bears against the coupling pin 10 in the usual well known manner when the device is in use. My invention is designed to provide means for elevating pin 10 out of the path of tongue 9 to permit jaw 7 to swing to its open position and to this end I provide on the upper face of jaw 6, at each side of the pin hole 11, ears 12 and 13. Pivotally connected at one of their ends to ears 12 and 13 are links 14 and 15 which extend forwardly and their opposite ends are pivotally connected to the end of furcations 16 and 17 of a fork 18. Furcations 16 and 17 straddle pin 10 and their connected end is pivotally connected to the upper end of a rocking lever 19, pivotally mounted in body 5 by means of pivot 20. Extending longitudinally of body 5 is a cylindrical opening 21, and in this opening is rigidly mounted an air cylinder 22. Slidably mounted in cylinder 22 is a piston 23 provided with a stem 24, the forward end of which is pivotally connected to the lower end of lever 19, below the pivot 20. Extending through the sides of body 5 are inlet openings 24 and 25 which register with openings 26 and 27 in opposite ends of cylinder 22. The outer ends of openings 24 and 25 are enlarged and screwthreaded and in these openings are mounted the ends of the inlet pipes 28 and 29. Pipes 28 and 29 extend to a suitable three way valve (not shown) of any suitable or desirable construction, said valve being in turn connected to an air supply (not shown) usually the air storage tank for the air brakes Provided on the upper end of pin 11, adjacent to the upper edge of the furcations 16 and 17 is an outstanding flange 30, which is of a diameter to extend across the entire width of said furcations and extending upwardly centrally of this flange is an ear 31, provided with an aperture 32 for the reception of the connecting means for the usual hand operating mechanism.

In the operation of my device the parts are shown in the drawings in their normal locking positions.

When it is desired to release the coupler air will be permitted to enter the cylinder 22 through pipe 29, and opening 25, thus forcing the piston 23 forwardly and rocking lever 19. The rearward movement of the upper end of lever 19 will rock links 14 and 15 upon their pivots, thereby elevating the free ends thereof and with them the free ends of the fork 18, the furcations 16 and 17 engaging the opposite sides of the flange 30 and elevating pin 10 sufficiently for the lower end thereof to clear the end of tongue 9 permitting the jaw to swing open. After the jaw is again closed air is permitted to enter the other end of cylinder 22, through pipe 28, (pipe 29 being opened to atmosphere) and piston 22 returned to its starting position permitting pin 10 to fall into position across the end of tongue 9.

Having described my invention what I claim is:

1. In a railway car coupling having a movable jaw and a pin for locking said jaw in its closed position, means to withdraw said pin from its operative position to permit said jaw to move to its open position, comprising a cylinder mounted within said coupling, connections from opposite ends of said cylinder to a control valve being adapted to connect either end of said cylinder to an air supply and the opposite end to atmosphere; a piston slidably mounted in said cylinder having a stem; a rocking lever pivotally mounted in said coupling to extend vertically, a connection between the lower end of said rocking lever and the free end of said piston stem, a pair of links pivotally mounted at one end on opposite sides of said coupling pin, a fork pivotally mounted at its closed end to the upper end of said rocking lever and having its other ends pivotally connected to the free end of said links, the legs of said fork passing on either side of said coupling pin.

2. A railway car coupling comprising a body a jaw pivotally connected to one end of said body having a rearwardly projecting tongue a pin mounted in said body adapted to project across the path of said tongue to prevent movement of said jaw, an air cylinder rigidly mounted in said body to extend longitudinally, a connection from opposite ends of said cylinder to a control valve, said control valve being adapted to connect either end of said cylinder to an air supply and the opposite ends to atmosphere, a piston slidably mounted in said cylinder having a stem the free end of said stem projecting through the forward end of said cylinder; a rocking lever pivotally mounted intermediate its ends in said body member between said cylinder and said pin, said pin, rocking lever and cylinder being in alinement longitudinally of said body, the lower end of said rocking lever being pivotally connected to the end of said piston stem; ears extending upwardly from said body at either side and at the rear of said pin, a pair of links pivotally mounted at one end in said ears, there being one link for each ear; an integral flange surrounding the upper end of said pin, a fork pivotally connected at its lower end to the other end of said rocking lever and having the legs thereof straddling said pin beneath said valve and having their free ends pivotally connected to the free end of said links.

3. In a railway car coupling having a movable jaw and a pin for locking said jaw in its closed position, means to withdraw said pin from its operative position to permit said jaw to move to its open position comprising a cylinder mounted within said coupling, connections from opposite ends of said cylinder to a control valve adapted to connect either end of said cylinder to an air supply and the opposite end to atmosphere; a piston slidably mounted in said cylinder having a stem and connections between said stem and said pin adapted when said piston is moved in one direction to withdraw said pin from its operative position and when said piston is moved in a reversed direction to permit said pin to return to its normal closed position.

In witness that I claim the foregoing I have hereunto set my hand this 24th day of April, 1926.

JOHN WILLIAM EASTER.